United States Patent [19]
Manchak, III et al.

[11] Patent Number: 5,348,422
[45] Date of Patent: Sep. 20, 1994

[54] METHODS FOR THE FORMATION AND OPERATION OF AN IN SITU PROCESS REACTOR

[75] Inventors: Frank E. Manchak, III; Michael E. Manchak; Peter J. Manchak, all of Santa Barbara, Calif.

[73] Assignee: Terranalysis Corporation, Santa Barbara, Calif.

[21] Appl. No.: 22,189

[22] Filed: Feb. 25, 1993

[51] Int. Cl.$^5$ .............................................. B09B 3/00
[52] U.S. Cl. ...................... 405/128; 405/38; 405/129; 405/267
[58] Field of Search ................. 405/128, 129, 131, 38, 405/303, 267; 37/142.5, 464, 359, 189; 210/751, 747, 739

[56] References Cited

U.S. PATENT DOCUMENTS

| | | | |
|---|---|---|---|
| 4,358,221 | 11/1982 | Wickberg | 405/128 X |
| 4,687,372 | 8/1987 | Thornton | 405/128 |
| 4,838,734 | 6/1989 | Pinto | 405/38 X |
| 4,849,360 | 7/1989 | Norris et al. | 405/128 X |
| 4,850,745 | 7/1989 | Hater et al. | 405/128 |
| 4,863,312 | 9/1989 | Cavalli | 405/267 X |
| 4,950,106 | 8/1990 | Richter | 405/128 |
| 5,120,160 | 6/1992 | Schwengel | 405/129 X |
| 5,252,226 | 10/1993 | Justice | 210/747 X |
| 5,286,140 | 2/1994 | Mather | 405/128 |

Primary Examiner—Dennis L. Taylor
Attorney, Agent, or Firm—Roth & Goldman

[57] ABSTRACT

A hazardous waste site remediation process for decontamination of petrochemical and other toxic waste containing sites comprises in situ conversion of the site to a self contained process reactor which is then selectively operated by feeding a variety of treatment reagents thereto through a network of feed conduits and removing contaminants through removal conduits which collectively bring the contaminated materials to a collection area in the reactor where they can then be further treated or removed. A mobile trenching machine converts the site to a reactor by simultaneously placing contaminant impermeable walls while processing excavated materials such as by adding reactor reagents thereto and then immediately returning the processed materials to the location from which they were excavated in the site. Hydrocarbons or other useful by-products such as precious metals may be recovered from the soil.

16 Claims, 7 Drawing Sheets

METHODS FOR THE FORMATION AND OPERATION OF AN IN SITU PROCESS REACTOR

BACKGROUND OF THE INVENTION AND PRIOR ART

The present invention relates to the treatment of toxic waste contaminated sites which may contain chemical and/or radioactive compositions that pollute the environment and threaten public health and safety. The sites may contain one or more of various chemical and radioactive compositions, hydrocarbons and heavy metal contaminants. The contaminants present in such sites are wide ranging in both type and concentration levels. They vary from a wide range of organic, chlorinated and inorganic compounds and precious metals and in some cases such compounds may be mixed with radioactive materials ranging from low to intermediate radioactivity levels.

Conventional methods of remediating such waste disposal sites include:

1. Excavation and transportation of contaminated soils to other landfills;
2. Excavation and transportation of contaminated soils to a central offsite treatment plant;
3. Physical containment of the waste site with an impermeable wall which prevents migration of contaminants into the groundwater;
4. In situ treatment of the contaminants by stripping volatile organic compounds therefrom without excavation; and
5. In situ addition of treatment reagents without excavation.

Each of the above methods includes various drawbacks which primarily render them cost ineffective, dangerous to treatment personnel and generally ineffective treatment.

Operations which involve physical transportation of contaminated materials to a different treatment or landfill site clearly involve extra hazards of spill accidents during transport and the natural reluctance of residents in proximity to a landfill to accept additional materials which have been removed from other landfills or contaminated sites.

Prior art treatment methods which involve physical containment of a waste site with a contaminant barrier wall often result in a "bathtub effect" which often creates undesired downward migration or spillover of the contaminants through cracks or porosity of the containment wall.

In situ vapor extraction methods which involve the placement of standpipes into the contaminated subsurface for removal of volatiles inherently result in non-uniform treatment with the greatest effectiveness being only within a relatively short distance from the standpipes. Horizontal well systems are now believed to be somewhat more efficient although they are necessarily more difficult to install. U.S. Pat. No. 4,927,292 issued to Justice discloses such a system.

An in situ groundwater remediation system which uses two sets of horizontal wells at opposite sides of a generally unconfined contaminated zone, one for fluid injecting and one for extracting, is disclosed in U.S. Pat. No. 4,832,122 issued May 23, 1989 to Corey, et al.

Other methods which involve pumping and treatment of contaminated groundwater from an aquifer suffer from the problems of mass capital investment, high energy consumption and general inefficiency in treating the source of the problem, namely the contaminated soil.

It is therefore the primary object of the present invention to provide a cost effective and efficient method for in situ treatment of a hazardous waste disposal site.

In general, the solution to the problem involves conversion of the site into a self contained process reactor primarily through the use of a mobile apparatus comprising a trenching machine such as those disclosed in co-pending U.S. patent application Ser. No. 07/838,576 filed Feb. 18, 1992 by Frank E. Manchak, III and Peter Manchak which is capable of operating to subsurface depths as low as 40 feet below the ground elevation and which effectively excavates, processes, and immediately recirculates processed waste contaminated soil back into the excavated trench in a rapid and continuous fashion. The reactor is then operated by selectively causing volatilization of contaminants and moving them to a collection location in the reactor and selectively feeding selected treatment reagents and microorganisms thereto as desired.

Accordingly, the present invention provides

DESCRIPTION OF THE PREFERRED EMBODIMENT

Figure 1:
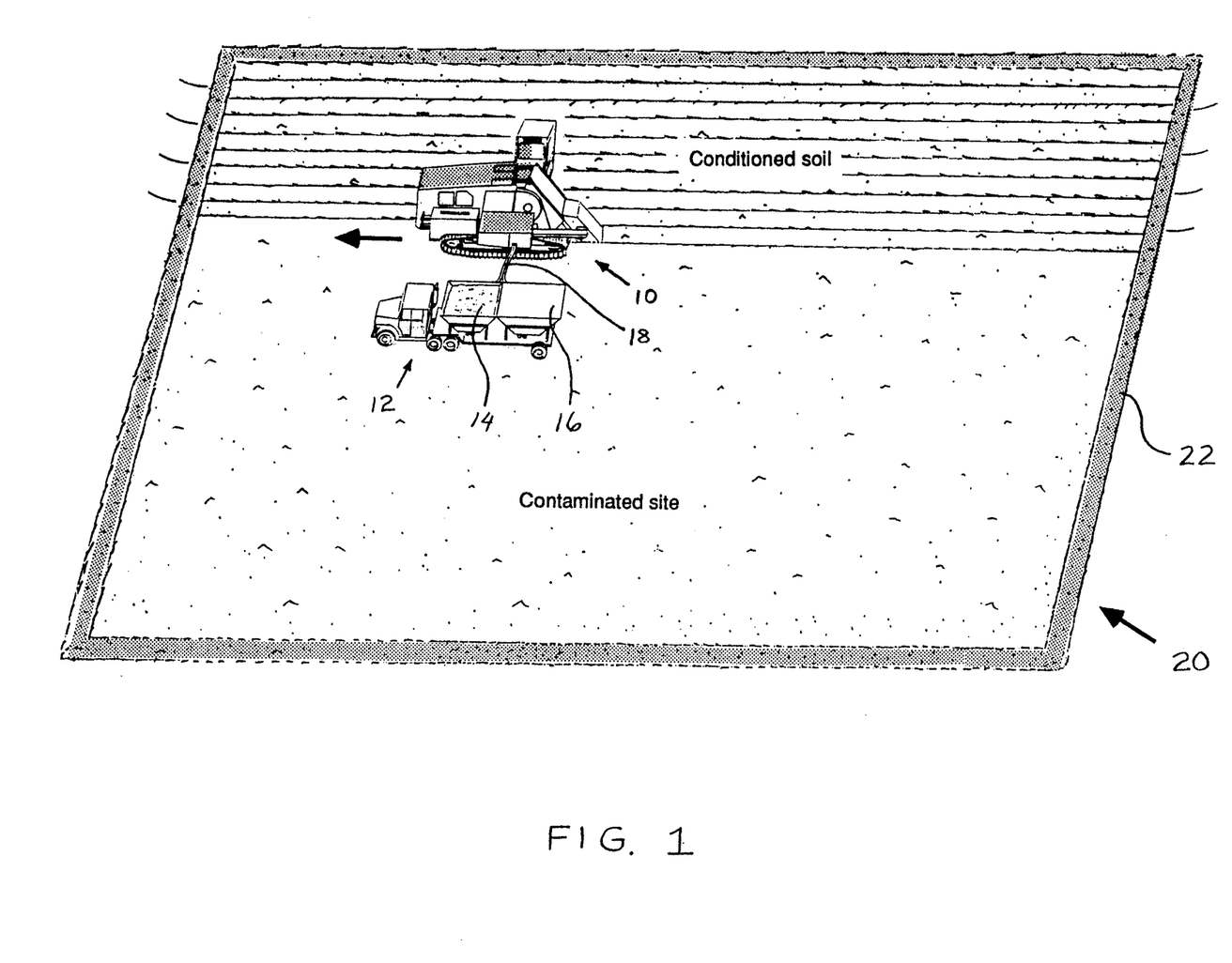
FIG. 1 is a perspective view of a hazardous waste disposal site in the process of being converted by a mobile surface remediation apparatus to an in situ reactor.

As seen in FIG. 1, a surface soil remediation apparatus 10 comprises a trenching machine which travels to the left as shown by the arrow and which is provided with elongated crawler tracks or treads or, in the alternative, a wheeled drive can be used if desired. The machine includes a trenching boom which can be raised or lowered to its desired digging depth. A supply truck 12 having one or more containers 14, 16 of treatment reagents and a conduit 18 for transferring the reagents to the remediation apparatus 10 as will be described moves with the remediation apparatus 10 as it repeatedly traverses a hazardous waste site 20 to be converted to a waste treatment reactor within the confines of a waste impervious containment wall 22 which may also be placed by the remediation apparatus 10 as will be described.

Figure 2:
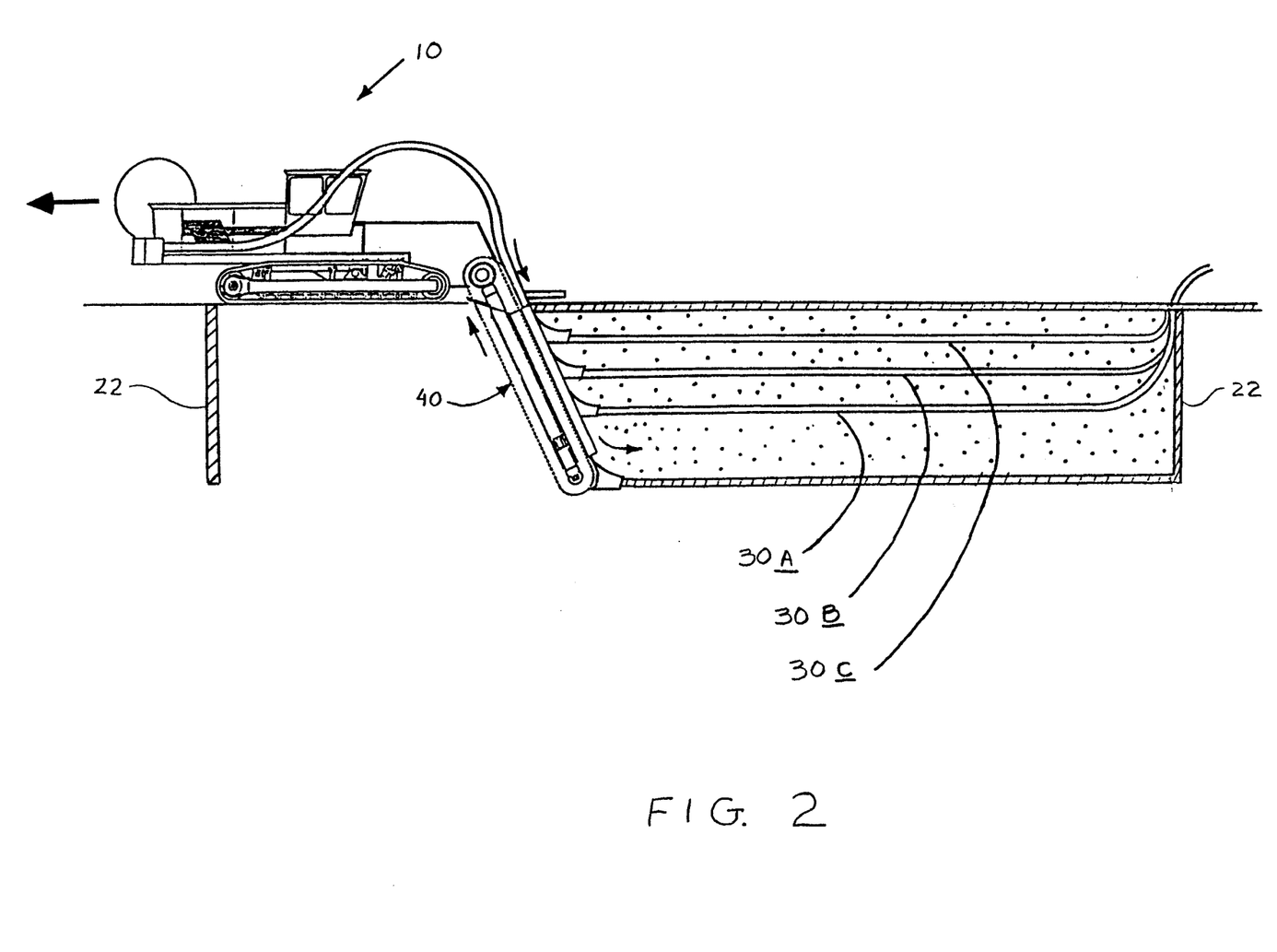
FIG. 2 is a schematic side elevation view of a mobile surface remediation apparatus operating within the confines of a previously placed vertical contaminant containment wall.

FIG. 2 shows the apparatus 10 placing a network of perforated horizontal reagent feed conduits 30 a-c as it simultaneously excavates and remediates or prepares the excavated soil for remediation. The digging boom 40 has an endless conveyor 42 (FIG. 3) mounted thereon as is conventional and a series of milling teeth 44 (or soil elevators) is mounted on the conveyor 42 to continuously lift and remove excavated soil from the trench.

Also mounted on the remediation apparatus 10 is a series of process conveyors which receives soil to be processed or treated and which is arranged for immediately returning and replacing soil in the trench immediately behind the digging boom 40.

Figure 3:
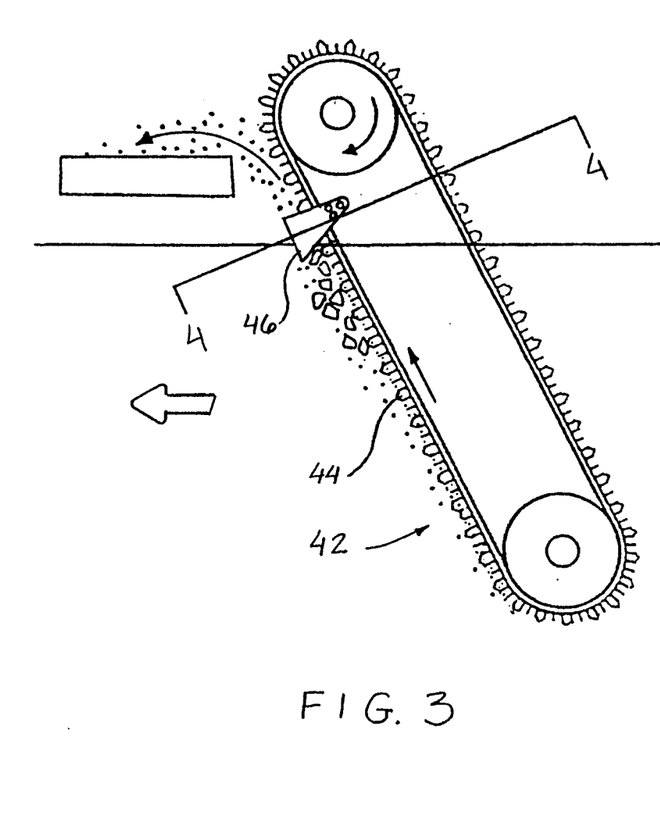
FIG. 3 is an enlarged cross section of the digging boom of the apparatus of FIG. 2.
Figure 4:
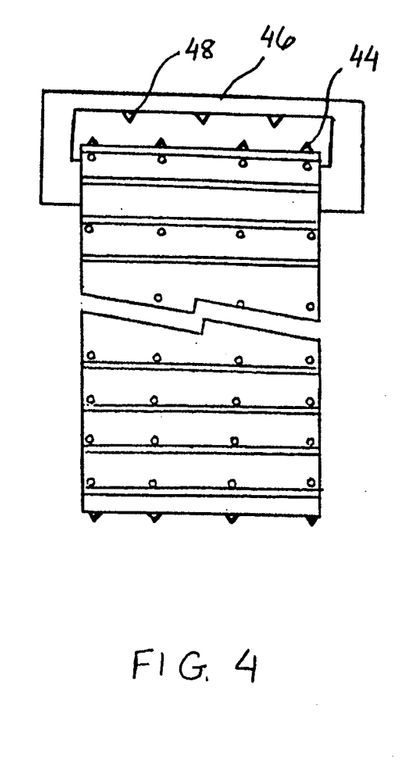
FIG. 4 is a cross section taken at line 4—4 of FIG. 3.

The upwardly moving flight of conveyor 42 and the milling teeth 44 thereon elevate soil and rocks adjacent the digging face of the trench upwardly past a milling bar 46 affixed to the digging boom 40 as seen in FIG. 3. The configuration of the milling bar is best seen in FIG. 4 as a generally U-shaped member having milling teeth 48 thereon which oppose the milling teeth 44 to grind rocks to a predetermined size or prevent them from being conveyed upwardly to the remainder of the apparatus.

Figure 5:
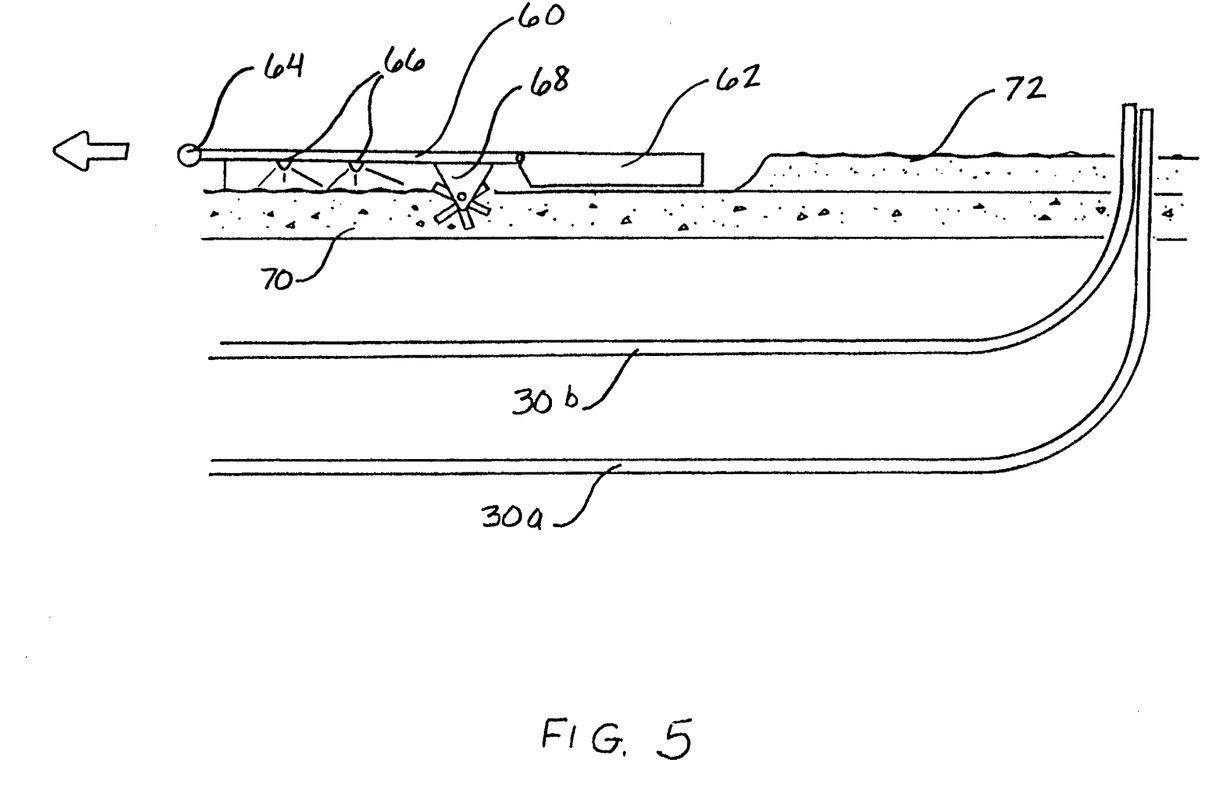
FIG. 5 is an enlarged schematic of a portion of FIG. 2 showing placement of a surface cap on the waste site.

The remediation apparatus 10 may also include a surface contaminant containment barrier former 60, seen to an enlarged scale in FIG. 5. The former 60 includes a weighted towed compactor 62 and a hitching bar 64 for connecting the compactor 62 to the remediation apparatus 10. A plurality of reagent spray nozzles 66 and a mixing and compactor wheel 68 may also be provided for mixing hardening reagents with a surface layer of excavated soil to be compacted by the compactor 62 and subsequently allowed to harden to form an impermeable contaminant containment barrier 70 on the reactor. A final cap layer 72 of asphalt or the like may also be subsequently applied on top of barrier 70 if desired.

Figure 6:
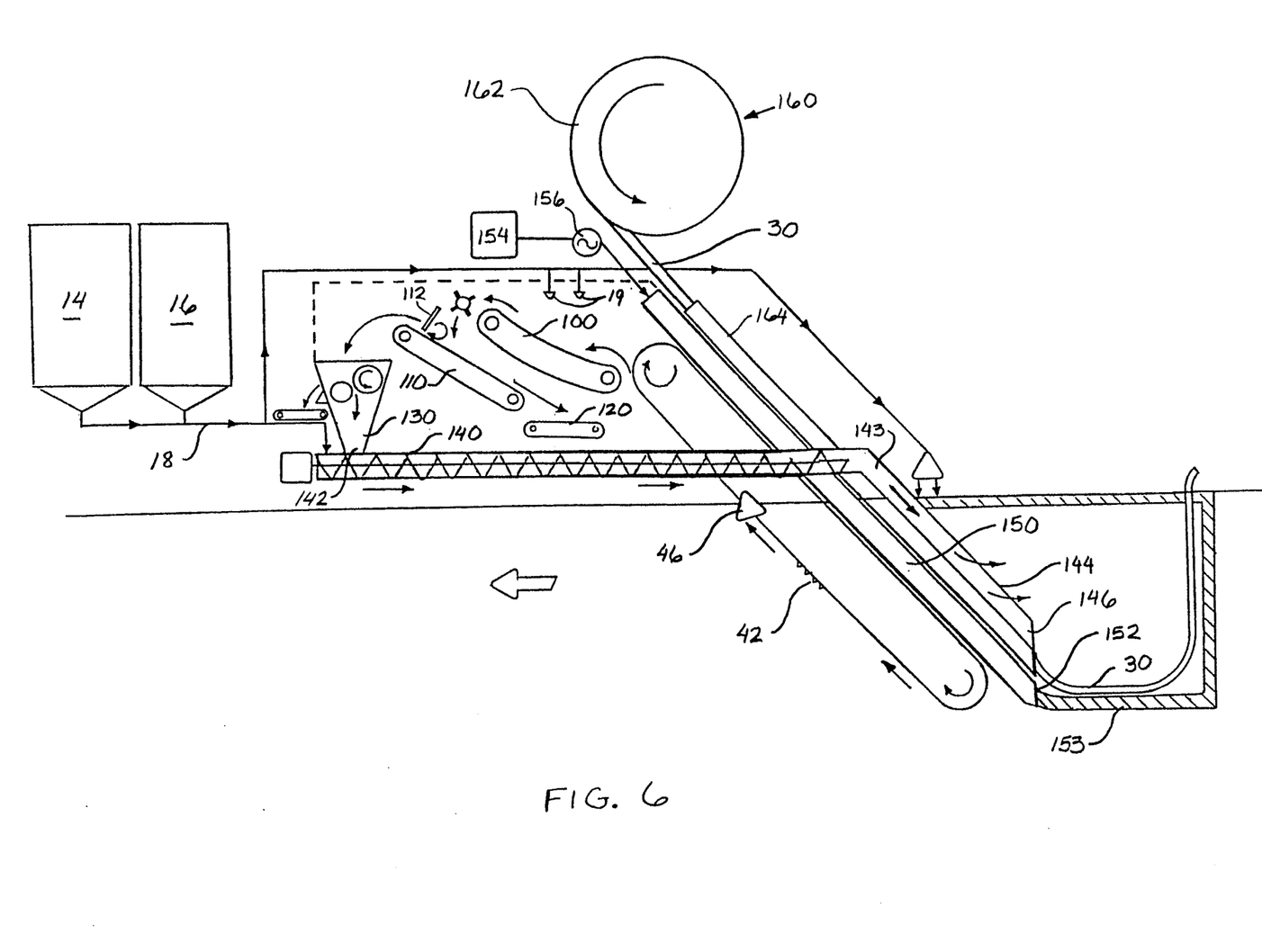
FIG. 6 is a schematic side elevation, similar to FIG. 2, showing the flow of contaminated soil and the processing thereof.
Figure 7:
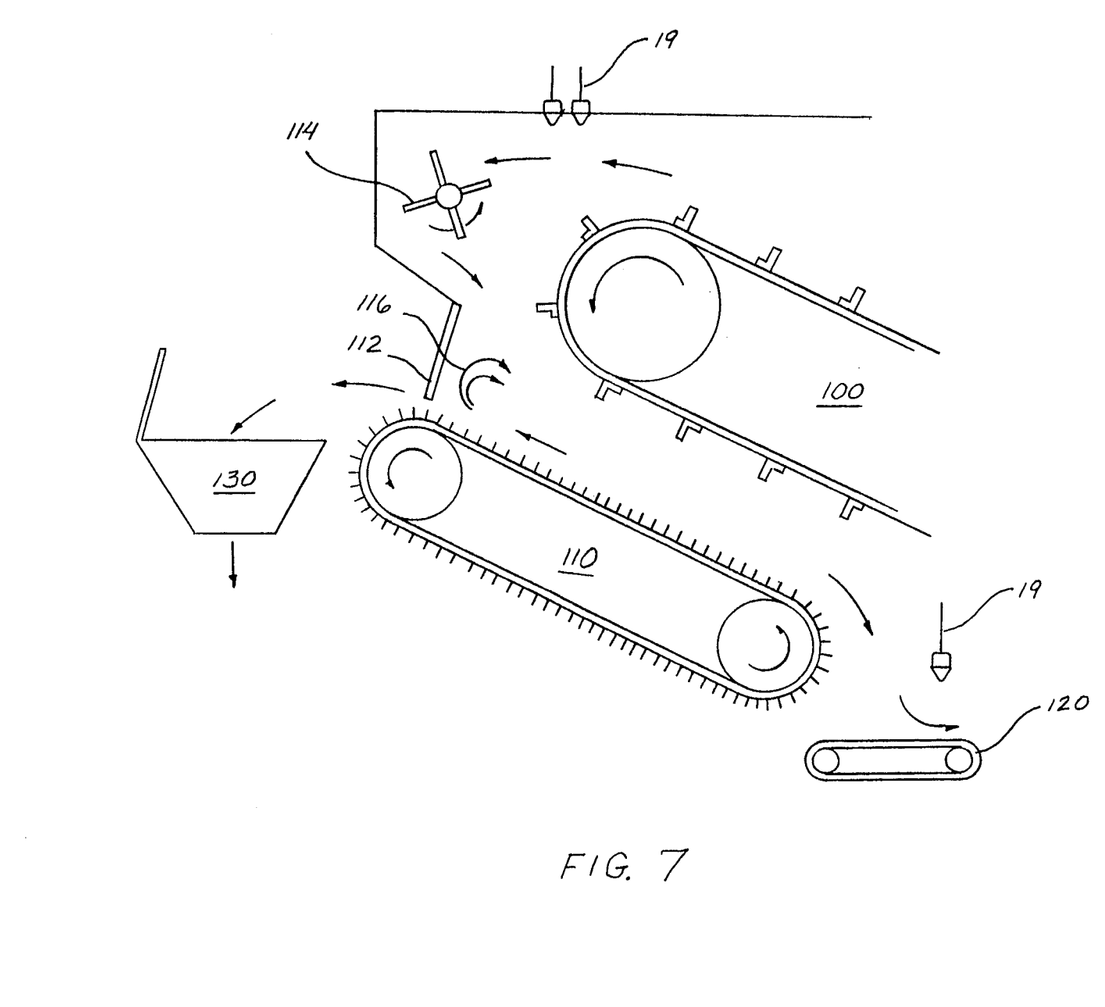
FIG. 7 is an enlargement of a portion of FIG. 6 showing separation of rocks from excavated soil.

Turning now to FIG. 6, upwardly conveyed soil and rocks which have passed through milling bar 46 are discharged from the upper end of the digging boom conveyor 42 onto the upper flight of a first process conveyor 100 shown to an enlarged scale in FIG. 7. First process conveyor 100 then discharges mixed soil and rocks onto the upper flight of a second process conveyor 110 which permits excavated materials to pass between its upper flight and the lower end of a separator baffle 112 into a hopper 130. Heavier rocks gravitationally tumble in countercurrent to the soil to the upper surface of a third process conveyor 120 from which they may be collected and removed from the reactor or returned to the trench as desired. A rotatable mixing blade 114 assists in establishing a generally circular flow 116 of mixed rocks and soil near the baffle 112 to assist in separation of rocks from the soil.

FIG. 6 also shows a fourth process conveyor 140 in the form of an elongate screw conveyor which, at its entrance end 142, receives separated soil from hopper 130 whereby the soil is combined and mixed in conveyor 140 with liquid and/or solid reagents from the supplies 14, 16 carried on the truck supplied via the reagent feed conduit 18. Liquid reagents from conduit 18 may also be jetted from a plurality of nozzles 19 onto the excavated soil and rocks for treatment thereof.

The remediation apparatus 10 may also include a hood or shroud (not shown) mounted to enclose and contain the trenching operation to prevent or minimize the escape of harmful contaminants from the open trench into the atmosphere. The details of the shroud arrangement will be apparent to persons skilled in the art. The interior of the shroud will typically be maintained under subatmospheric or vacuum pressure conditions by a vacuum pump which prevents release of harmful contaminants to atmosphere.

FIG. 6 also shows an extrusion conduit 150 having a discharge end 152 arranged proximate the lower end of the digging boom 42 at the trailing side thereof to enable simultaneous placement of a substantially impervious bottom contaminant containment layer 153 in the site while excavating contaminated soil form the site above the bottom containment layer. A hopper 154 of hardenable bottom layering material such as asphalt and an extruder 156 are connected as shown to supply liner material to extrusion conduit 150.

A reel apparatus 160 for placing flexible conduit 30 to form a grid of in situ contaminant treatment and monitoring pipes or conduits is schematically shown mounted on remediation apparatus 10. The flexible conduits 30 may take various forms such as perforated conduits and electrical resistance heaters, the term "conduit" being herein intended to have a broad meaning. Conduits 30 are discharged from a plurality of side by side spools 162 through guides 164 having conduit discharge ends disposed in the trench at selected elevations whereby a plurality of conduits 30 can be placed simultaneously with the trenching process and covered during the same operation. The grid may be configured in various patterns such as parallel conduits, crisscross parallel conduits placed at different elevations or perimeter conduit placement, etc.

Downwardly extending from the discharge end 143 of fourth process conveyor 140 is a treated soil extrusion conduit 144 having a discharge end 146 disposed adjacent to and rearwardly of the digging boom at an elevation slightly above the elevation of the discharge end 152 of the bottom layer extrusion conduit 150. As will be appreciated by those skilled in the art, means for vibrating one or both of the conduits 144 and 150 may be provided to assist flow of materials therethrough.

Figure 8:
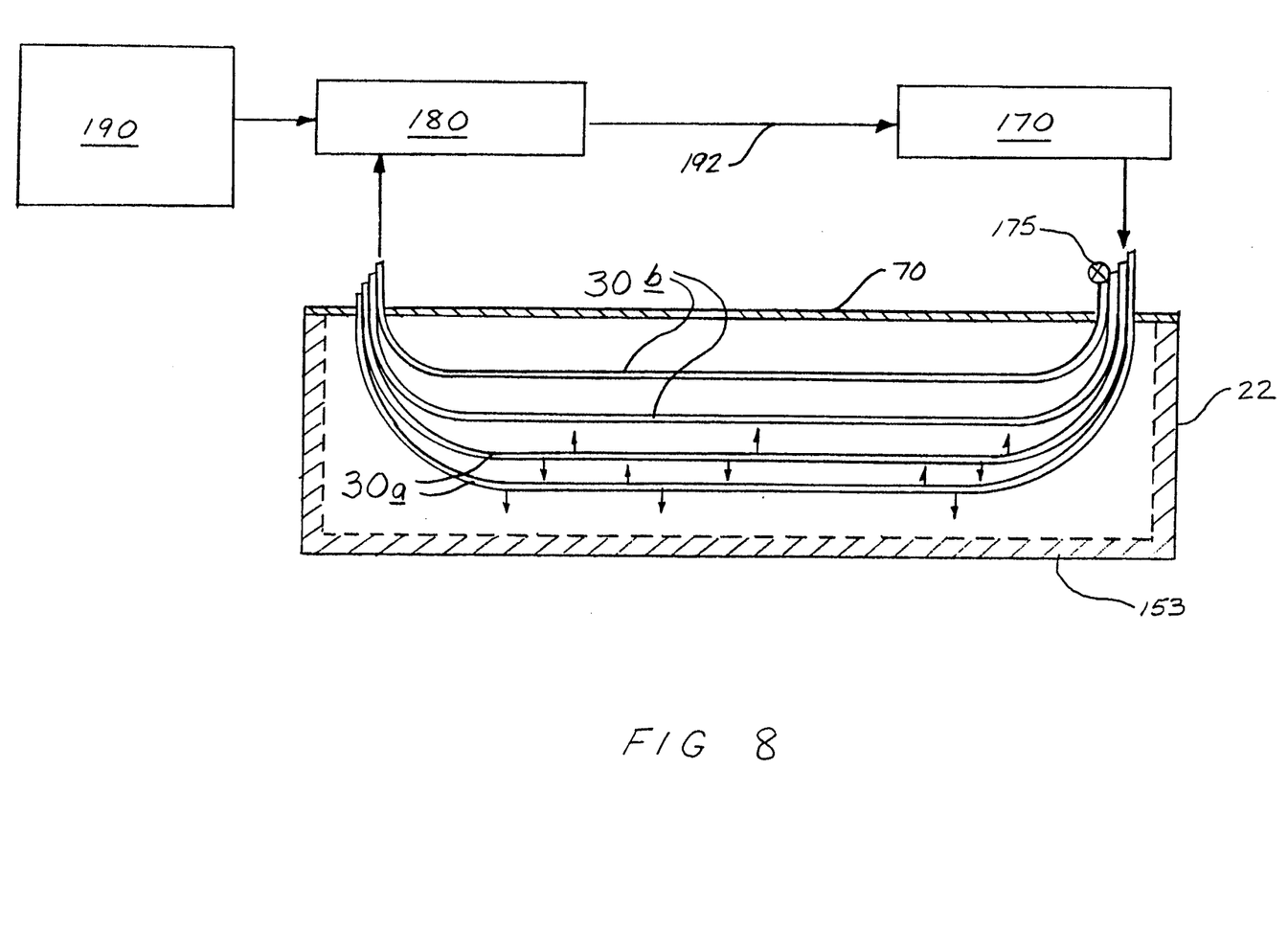
FIG. 8 is a perspective schematic view showing the operation of an in situ reactor.

FIG. 8 schematically shows a site which has been completely converted to a reactor and the operation thereof.

THE SITE CONVERSION PROCESS

Conversion of a hazardous waste disposal site to an in situ self contained process reactor broadly involves first delineating the three dimensional boundaries of the site, establishing an essentially impervious contaminant containment barrier around, below and on top of the site, and then operating the reactor to volatilize volatile hydrocarbon and other contaminants therein and remove them from the reactor. Typically, a vertically extending containment barrier wall 22 is first constructed around the perimeter of the site. This can be accomplished in a variety of ways including digging a trench and then installing prefabricated wall sections in the trench; digging a trench and casting a concrete wall in place; or, it is particularly advantageous to use a surface remediation apparatus of the types disclosed in co-pending U.S. patent application Ser. No. 07/838,576 Filed Feb. 18, 1992 by Frank E. Manchak, III and Peter Manchak since apparatus of this type excavates and immediately refills a trench with a mixture of excavated soil and hardenable barrier forming material with a minimum area of open trench at any one time. This in turn minimizes the possibility of escape of harmful materials to the atmosphere despite prior precautions to excavate and construct the barrier wall a safe distance outside of the known contaminated area of the site.

Following construction of the vertical perimeter wall, the contaminated site is processed to prepare the soil therein for subsequent operation as a waste treatment reactor. This is accomplished by having the remediation apparatus 10 repeatedly traverse the area of the site inside the perimeter containment wall 22 while excavating contaminated soil and pre-processing it by adding porosity agents or other treatment reagents thereto above the surface of the site and then immediately replacing the excavated and pre-processed materials back into the trench. Simultaneously, the apparatus 10 lays a bottom contaminant containment liner in the site and may also simultaneously place a network of feed conduits and a network of perforated contaminant removal conduits in the site. Alternatively, the feed and removal conduits 30 can be separately placed later. The feed conduits are ordinarily placed below and horizontally outside the network of perforated contaminant removal conduits to ensure process flow in the reactor from the feed conduits through the contaminated waste to the removal conduits rather than toward the bottom and side barrier walls. For example as seen in FIG. 8, the lower conduits 30a are feed conduits and the upper conduits 30b are perforated contaminant removal conduits. Although generally horizontally extending conduits 30 are shown for illustrative purposes, vertically extending conduits or standpipes are also contemplated herein.

Either during pre-processing or after the site is completely pre-processed, a top contaminant barrier is placed to completely contain the hazardous waste.

THE REACTOR OPERATION

FIG. 8 shows a reactor comprised of a vertically extending contaminant containment wall 22, a horizontally extending bottom liner 153 and a top barrier 70 containing networks of feed conduits 30a and perforated contaminant removal conduits 30b. Feed conduits 30a receive treatment reagents or heat from a source 170 thereof and are arranged to distribute the reagents or heat substantially uniformly throughout the pretreated contaminated soil. Perforated contaminant removal conduits 30b are connected to a manifold having a normally closed valve 175 at one end and each have their contaminant discharge ends directed to a contaminant recovery system 180 such as a scrubber, the details of which are not relevant to this disclosure. Monitoring equipment and instrumentation 190 is provided for checking on the progress of the reactor operation or site clean up. If reagents such as surfactants are employed, the recovery system may separate contaminants from used surfactant which can then be recirculated in conduit 192 to supplement the reactor feed.

As will be appreciated by those skilled in the art, the feed conduit grid system may deliver a wide variety of biochemical nutrients or chemical treatment reagents from sources with the capabilities of changing the pH, neutralizing hydrogen sulfides, and neutralizing, breaking or rendering less harmful specific carbon and chlorine rings. Organophilic reagents may also be used to treat organic compositions in situ. When bioremediation methods are selected, select microbes and nutrients can be added to the soil via the grid arrangement.

Persons skilled in the art will readily appreciate that various modifications can be made from the preferred embodiment thus the scope of protection is intended to be defined only by the limitations of the appended claims.

We claim:

1. A process for the conversion of a hazardous waste disposal site to an in situ process reactor and operating same to remediate the site comprising the steps of:
   a) establishing an essentially impervious contaminant containment wall around the site;
   b) placing a liner forming material inside of said wall on the bottom of said site to form an essentially impervious bottom contaminant containment liner in said site which extends to said containment wall while simultaneously excavating and processing contaminated soil excavated from said site at a location above the surface of said site and returning the processed soil into said site above said bottom liner;
   c) placing a network of perforated feed conduits and a network of perforated contaminant removal conduits in said reactor, said contaminant removal conduits leading to a contaminant removal location in said reactor;
   d) forming an essentially impervious contaminant containment barrier on top of said site whereby said wall, bottom liner and top barrier completely enclose the contaminated soil in said site thereby converting said site to a self contained reactor;
   e) operating said reactor to volatilize volatile contaminants therein;
   f) moving a fluid stream containing volatiolized contaminants to said collection location in said reactor; and
   g) removing said fluid stream of volatized contaminants from said collection location.

2. The process of claim 1, wherein said contaminant containment wall is formed by simultaneously excavating soil from a trench and processing said soil by mixing cementitious wall forming material thereto above said site and returning the mixed soil and liner forming material to said trench.

3. The process of claim 1, wherein said top barrier is formed by simultaneously excavating soil from a trench, mixing hardenable barrier forming material to excavated soil above said site and returning the mixed soil and barrier forming material to form said barrier on top of said trench.

4. The process of claim 1, wherein said above site processing of excavated soil comprises adding treatment reagents thereto.

5. The process of claim 1, wherein said above site processing of excavated soil comprises separation of rocks above a predetermined size therefrom.

6. The process of claim 1, wherein said above site processing of excavated soil comprises adjusting the permeability thereof.

7. The process of claim 1, wherein said network of perforated feed conduits is placed in said site while processing said excavated soil and including the step of operating said reactor by feeding contaminant treatment reagents into said reactor through said conduits.

8. The process of claim 1, further comprising the steps of placing a network of heating means in said reactor and operating said reactor by heating said heating means.

9. The process of claim 8, wherein said heating is electrical resistance heating.

10. The process of claim 1, wherein said network of perforated contaminant removal conduits is placed in said reactor during processing of said excavated soil.

11. The process of claim 1, further comprising the steps of scrubbing said fluid stream to remove contaminants therefrom.

12. The process of claim 1, comprising the steps of operating said reactor by adding surfactant thereto via said feed conduits, removing contaminant laden surfactant from said reactor, separating said contaminants from said surfactant and recycling said surfactant for further use in the process.

13. The process of claim 1, comprising the steps of operating said reactor by adding biological treatment agents thereto via said feed conduits.

14. The process of claim 13, further comprising the step of operating said reactor by maintaining a substantially constant moisture content and temperature in said reactor to enhance biological activity therein.

15. The process of claim 1, further comprising the steps of placing a series of electrodes in said site and operating said reactor by supplying electrokinetic contaminant flushing fluid into said reactor via said feed conduits and establishing a voltage gradient between said electrodes to assist flushing of contaminants from said reactor through said contaminant removal conduits.

16. The process of claim 1, further comprising the step of applying a negative pressure at said removal location to cause said fluid stream to flow thereto.

* * * * *